May 10, 1927.
L. B. MILLER
METHOD OF MOLDING SILICA
Filed Nov. 24, 1925
1,628,417
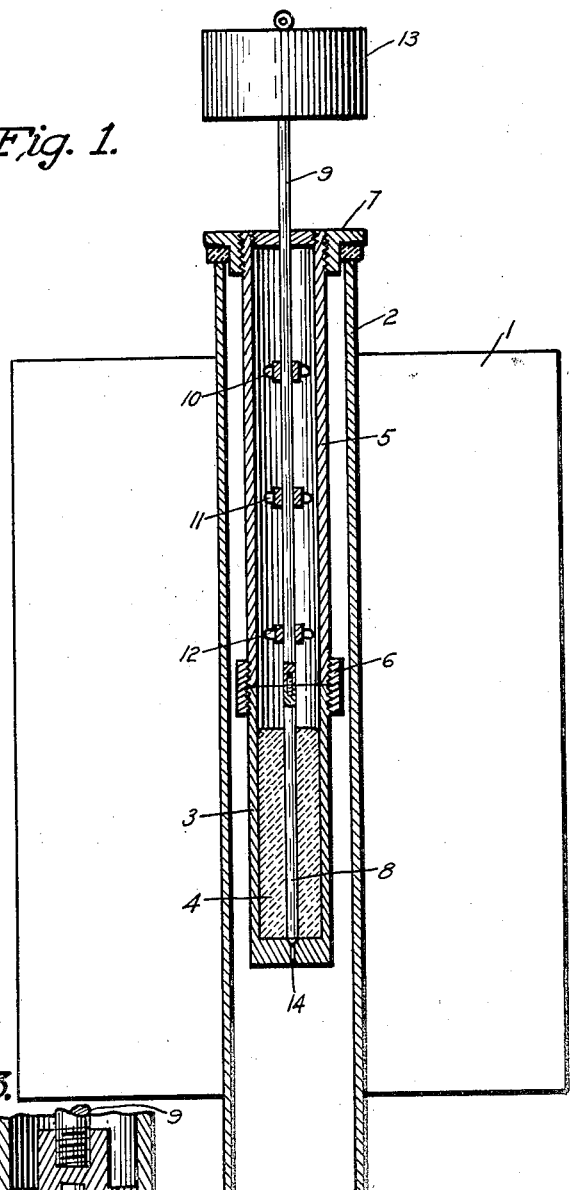
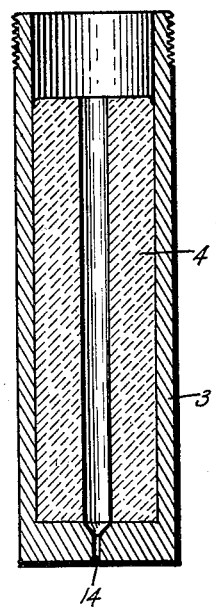
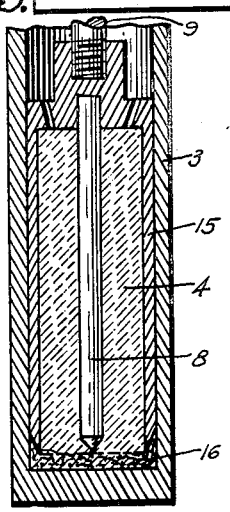
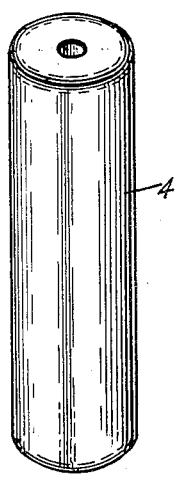
Inventor,
Levi B. Miller,
by
Attorney.

Patented May 10, 1927.

1,628,417

UNITED STATES PATENT OFFICE.

LEVI B. MILLER, OF LYNN, MASSACHUSETTS, ASSIGNOR TO GENERAL ELECTRIC COMPANY, A CORPORATION OF NEW YORK.

METHOD OF MOLDING SILICA.

Application filed November 24, 1925. Serial No. 71,245.

The present invention relates to the molding or shaping of vitreous silica and its object is to produce articles of regular form such, for example, as cylindrical bodies of silica having a smooth surface and in particular to produce thick walled tubular blanks of silica, which are adapted to be drawn out into long, thin walled tubing.

Although it is practicable to carry out the fusion of silica in a graphite container without unduly contaminating the silica by the formation of carbon compounds, some difficulty is experienced due to the sticking of carbon to the surface of the solidified mass, as its removal leaves irregularities in the surface of the product. When the fused silica is to be employed for the subsequent fabrication of articles, for example by cutting up the solidified mass of silica into plates or by extruding it when plastic through a die, then no difficulty is experienced with surface irregularities. However, in some cases it is desirable to produce an article of regular configuration and in particular to produce hollow slugs of silica having a smooth interior bore. If such hollow slugs are produced by simply melting silica in a carbonaceous container around a core also consisting of carbonaceous material, then due to excessive heat being required to effect a complete settling the core will be found to be firmly imbedded in the solidified mass so that its removal is very troublesome, also numerous pockets and irregularities will be found on the surface of the slug.

In accordance with my present invention, I have provided a method whereby a smooth bore slug can be conveniently and cheaply produced by forcing the core or other molding member into the silica when heating to plasticity, the core preferably also being heated, and then immediately chilling the molded mass to prevent chemical reaction between the silica and the molding member. The chilling step can be carried out by merely removing the mold and silica from the furnace into the open air. With this precaution the molding member will not adhere to the silica and, therefore, may be readily removed from the solidified article which will have a regular configuration.

My invention is illustrated by the accompanying drawing in which Fig. 1 is a somewhat conventional longitudinal section of a silica fusion apparatus; Figs. 2 and 3 are sectional views of different forms of molds and Fig. 4 is a perspective view of a finished hollow slug.

In Fig. 1 the heater element and the surrounding screws have been merely indicated by the rectangle 1 surrounding the tubular container 2 in which the fusion is carried out. These parts of the furnace are described in my former Patent No. 1,549,597 issued August 11, 1925. Within the tubular container is suspended a refractory crucible 3 in which is contained a charge of quartz or silica 4. The container 3, which ordinarily consists of graphite is threaded at its upper end and is attached to a threaded tubular support 5 by a coupling 6. The support 5 is threaded at its upper end into a cap 7 which rests on the tube 2.

After a charge of silica in the graphite container 4 has been heated to a temperature of plasticity, which should occur with sufficient speed to prevent adhesion of the silica to the container, a refractory core member 8 is pushed down into the plastic mass into the position shown in the drawing. The core member 8, which also may consist of graphite and which should have a smooth exterior is attached to a graphite rod 9 traveling between suitable guides 10, 11 and 12 and provided with a propelling device represented by the weight 13. In order to get the best and cleanest product both the crucible 3 and the core member 8 should be vacuum fired at a high temperature, say to about 2000° C. before the fusion is carried out and the core member 8 preferably should be preheated to a temperature approximating the temperature at which silica becomes plastic which is about 1700° C. The preheating of the core member 8 is easily carried out by having it in a position just above the crucible 3 while the silica is being heated to plasticity. The bottom of the crucible 3 preferably is perforated as indicated at 14 in order to permit gas to escape and preferably is provided with a depression into which the pointed end of the core member 8 is brought to bear.

When the core 8 has been introduced into the plastic silica then the crucible is immediately removed from the furnace, for example, by withdrawing the entire structure supported by the tube 5. If the heating of the silica to plasticity occurs at a sufficiently high rate and the mass is not overheated very little adherence occurs between the solidified silica and the crucible 3. The core member 8 may be withdrawn from the slug leaving a smooth bore as shown in Fig. 2. The outer container 3 may be cracked off the exterior of the hollow slug. Its contraction upon the core makes its removal in any other way impracticable. There then remains as shown in Fig. 4, an article of regular interior and exterior configuration.

If it is desired to produce an article having more accurate exterior configuration then an exterior as well as an interior molding member may be introduced into the plastic fusion. In the apparatus illustrated in Fig. 3, the plunger introduced into the silica fusion comprises both a core member 8 and also a cylindrical exterior member 15 which fits into the interior of the mold 3. The introduction of this exterior member 15 simultaneously with the core member 8 pushes the layer of silica immediately adjacent the wall crucible 3 downward to the bottom of the crucible as indicated at 16. When the crucible and its contents are immediately removed from the furnace and cooled no substantial adhesion occurs between the slugs of silica and the core members 8 and 15 so that the smooth regular body is produced as shown in Fig. 4. The material 16 the bottom of which is associated with a small amount of carbon may be cut off and rejected.

It should be understood that various changes and modifications may be made in carrying out my invention. For example, the molding member may be introduced with a motion other than rectilinear and may be shaped to mold the quartz fusion into forms more complex than a simple cylinder.

What I claim as new and desire to secure by Letters Patent of the United States is:—

1. The method of producing a hollow silica article which consists in heating a charge of silica to plasticity in a mold, introducing a core member into the plastic charge, then cooling to cause said charge to solidify, in the mold with said member in place, the cooling occurring with sufficient rapidity after introduction of the core member to prevent adhesion of the charge and core member and finally removing the mold and core from the solidified charge.

2. The method of producing hollow slugs of silica which consists in heating a charge of silica to about 1700° C. in a graphite container, perforating the plastic mass with a graphite plunger, cooling said charge before adhesion of the plunger to the silica has occurred, withdrawing the plunger from the solidified charge and breaking away the container from the charge.

3. The method of producing a tubular body of silica which consists in molding plastic silica between a core and shell of refractory material, cooling said silica in situ to a solidifying temperature with sufficient promptness after molding to prevent adhesion of the silica to the core and shell and withdrawing said molding members from the solidified material.

4. The method of producing a hollow silica body which consists in introducing a graphite molding member into a charge of plastic silica, cooling said charge with sufficient promptness to prevent adhesion of said member to the silica and withdrawing the molding member from the solidified silica.

In witness whereof I have hereunto set my hand this 20th day of November 1925.

LEVI B. MILLER.